United States Patent Office 3,260,595
Patented July 12, 1966

3,260,595
PROCESS FOR THE MANUFACTURE OF VANADIUM-GALLIUM INTERMETALLIC COMPOUND
Richard Maier, Erlangen, Germany, assignor to Siemens-Schuckertwerke Aktiengesellschaft, Berlin - Siemensstadt, Germany, a corporation of Germany
No Drawing. Filed Feb. 3, 1965, Ser. No. 430,196
Claims priority, application Germany, Feb. 7, 1964, S 89,421
6 Claims. (Cl. 75—200)

My invention relates to a powder-metallurgical process of producing the intermetallic compound vanadium-gallium $V_3Ga$, which possesses superconducting properties and has a high critical magnetic field.

Superconductors having a high critical magnetic field are increasingly in demand for the production of components which must remain superconductive in strong magnetic fields and as materials for superconducting coils used in the production of strong magnetic fields.

The intermetallic compound vanadium-gallium with beta-tungsten crystalline structure ($V_3Ga$) is of special significance. At 0° K. this compound has a critical field strength of at least 300 to 400 kilogauss, its transition temperature being at about 14.5° K.

The conventional powder-metallurgical process of producing intermetallic compounds is not suitable for the production of vanadium-gallium ($V_3Ga$). Such process requires mixing the stoichiometrical quantities of the elements in powdered form, pressing the mixed powder and then sintering it at about 900 to 1100° C. in vacuum or protective gas. An attempt to produce $V_3Ga$-compound in this manner fails because the gallium powder turns liquid during the pressing step on account of its low melting point (29.5° C.).

The attempt to immerse and anneal a compressed body of pure vanadium powder in liquid gallium, likewise fails to have satisfactory results. Tests have shown that in the marginal region of the body, where sufficient gallium is available, there occurs an exothermic reaction at about 700° C. resulting in the formation of the compound $V_2Ga_5$, while pure vanadium remains in the interior of the body. Even with a very long annealing time, the vanadium reacts only slightly with the initially formed $V_2Ga_5$ compound, since the diffusion path is very long even in small bodies. The X-ray diffraction spectrum of a sample of pressed vanadium powder annealed for 70 hours in liquid gallium at about 1000° C. in a fused quartz ampoule showed essentially vanadium and $V_2Ga_5$, but very little $V_3Ga$.

It is an object of my invention to provide a process for the powder-metallurgical production of the intermetallic compound vanadium-gallium ($V_3Ga$), and particularly a process affording a good yield even with relatively short annealing periods.

In accordance with the invention, vanadium powder and $V_2Ga_5$-powder are mixed in the stoichiometric ratio corresponding to the reaction equation $$13V + V_2Ga_5 \rightarrow 5V_3Ga$$

The powder mixture is then pressed to a shaped body, and the body is thereafter sintered at a temperature between 1150 and 1400° C.

The sintering temperature must be chosen within this range because the upper limit of 1400° C. is the dissociation temperature of $V_3Ga$, and the lower limit of 1150° C. is the peritectic formation temperature of a phase with about 46% gallium content.

The invention will be further described with reference to an example.

The starting material $V_2Ga_5$ may be produced, for instance, by heating a preferably stoichiometrical mixture of vanadium powder and gallium powder to about 700° C. The resulting exothermic reaction causes the formation of metallically lustrous needles of $V_2Ga_5$ of about 1 cm. length and about 0.5 mm. thickness. By grinding these needles, the desired $V_2Ga_5$-powder is obtained.

The $V_2Ga_5$-powder is mixed with vanadium powder in the stoichiometric ratio corresponding to the reaction equation:

$$13V + V_2Ga_5 \rightarrow 5V_3Ga$$

The powder mixture thus produced is subjected to a pressure of about $5 \cdot 10^3$ to $10 \cdot 10^3$ kp./cm². The pressed body is degassed by heating it up to a temperature of about 600° C., preferably in vacuum, for example, of about $10^{-2}$ torr. During such heating, water vapor escapes at about 250° C., and hydrogen at about 500° C. Both gases were presumably adsorbed during the pressing stage at the large surface of the powder mixture. A heating period of 30 to 60 minutes, for example, is sufficient, but this period is in no way critical and may be shortened or extended. After degassing, the body is sintered under protective gas, for example, in argon of approximately ½ atmosphere, for about 1 hour at a temperature of about 1300° C. The positive pressure of about ½ atm. argon serves to minimize the evaporation of the gallium at the high sintering temperature.

In the manner described, sintered bodies of $V_3Ga$ were produced, having a weight of 6.950 g. after sintering and a density of 4.87 g./cm.³, and a space-filling degree of about 75%. The X-ray diagram of the product showed only the reflex diagram of $V_3Ga$. No presence of vanadium, gallium, their oxides and nitrides could be found roentgenographically. The micrograph of a ground and polished section was essentially of single-phase constitution. The magnetically measured transition temperature amounted to 14.55° K.

Sintered $V_3Ga$ produced according to the invention is suitable as starting material for further fabrication into superconducting electrical or magnetical components. However, structural components, for instance, may also be thus produced directly in the desired ultimate shape.

I claim:

1. The process of producing the intermetallic vanadium-gallium compound $V_3Ga$, which comprises mixing vanadium powder and $V_2Ga_5$-powder in the stoichiometric ratio corresponding to the equation $$13V + V_2Ga_5 \rightarrow 5V_3Ga$$

pressing the mixture to a shaped body, and sintering the body at a temperature between 1150 and 1400° C.

2. The process of producing the intermetallic vanadium-gallium compound $V_3Ga$, which comprises mixing vanadium powder and gallium powder substantially in the stoichiometric ratio $V_2Ga_5$, heating the mixture to about 700° C. to produce $V_2Ga_5$ compound, preparing from vanadium powder and powder made of said $V_2Ga_5$-compound a mixture in the stoichiometric ratio corresponding to the equation $13V + V_2Ga_5 \rightarrow 5V_3Ga$, pressing the latter mixture to a shaped body, and sintering the body at a temperature between 1150 and 1400° C.

3. The process of producing the intermetallic vanadium-gallium compound $V_3Ga$, which comprises mixing vanadium powder and $V_2Ga_5$-powder in the stoichiometric ratio corresponding to the equation $$13V + V_2Ga_5 \rightarrow 5V_3Ga$$

pressing the mixture to a shaped body, heating the body in vacuum up to a temperature of about 600° C. to degas the body, and then sintering the body at a temperature between 1150 and 1400° C.

4. The process of producing $V_3Ga$ compound according to claim 1, wherein said sintering is effected in a protective gas.

5. The process of producing $V_3Ga$ compound according to claim 1, wherein said sintering is effected in argon at a pressure of approximately ½ atmosphere.

6. The process of producing the intermetallic vanadium-gallium compound $V_3Ga$, which comprises mixing vanadium powder and $V_2Ga_5$-powder in the stoichiometric ratio corresponding to the equation $$13V + V_2Ga_5 \rightarrow 5V_3Ga$$

pressing the mixture at a pressure of about $5 \cdot 10^3$ to $10 \cdot 10^3$ kilopond per cm.² to a shaped body, heating the body in vacuum to a temperature between about 250 to about 600° C., and thereafter sintering the body in protective gas at a temperature of about 1300° C. for a period in the order of one hour.

References Cited by the Examiner

UNITED STATES PATENTS

| | | | |
|---|---|---|---|
| 3,028,341 | 4/1962 | Rosi et al. | |
| 3,084,041 | 4/1963 | Zegler et al. | 75—213 |
| 3,196,532 | 7/1965 | Swartz et al. | 75—200 X |

OTHER REFERENCES

Zeitschrift fur Physik, vol. 151, 1958, pp. 308–310.

LEON D. ROSDOL, *Primary Examiner.*

R. L. GRUDZIECKI, *Assistant Examiner.*